(12) United States Patent
Seraj

(10) Patent No.: US 10,594,128 B2
(45) Date of Patent: Mar. 17, 2020

(54) HOLDOUT DEVICES AND COVER ASSEMBLIES AND METHODS INCORPORATING THE SAME

(71) Applicant: Tyco Electronics Corporation, Berwyn, PA (US)

(72) Inventor: Mahmoud K. Seraj, Apex, NC (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 550 days.

(21) Appl. No.: 15/291,798

(22) Filed: Oct. 12, 2016

(65) Prior Publication Data

US 2017/0133833 A1 May 11, 2017

Related U.S. Application Data

(60) Provisional application No. 62/253,222, filed on Nov. 10, 2015.

(51) Int. Cl.
| | |
|---|---|
| *H02G 15/18* | (2006.01) |
| *H02G 15/26* | (2006.01) |
| *H02G 1/14* | (2006.01) |
| *H02G 15/00* | (2006.01) |
| *H02G 15/30* | (2006.01) |

(52) U.S. Cl.
CPC .............. *H02G 15/26* (2013.01); *H02G 1/14* (2013.01); *H02G 15/00* (2013.01); *H02G 15/003* (2013.01); *H02G 15/182* (2013.01); *H02G 15/30* (2013.01)

(58) Field of Classification Search
CPC ...... H02G 15/00; H02G 15/003; H02G 15/20; H02G 15/26; H02G 15/32; H02G 15/205–30; H02G 1/005; H02G 1/06; H02G 1/08–088
See application file for complete search history.

(56) References Cited

U.S. PATENT DOCUMENTS

| | | |
|---|---|---|
| 2,038,840 A | 4/1936 | Hall |
| 2,614,280 A | 10/1952 | Goosmann |
| 3,138,859 A | 6/1964 | Edwards |
| | (Continued) | |

FOREIGN PATENT DOCUMENTS

| | | |
|---|---|---|
| DE | 3001158 A1 | 7/1980 |
| DE | 19807840 A1 | 8/1999 |
| | (Continued) | |

OTHER PUBLICATIONS

Notification of Transmittal of the International Search Report and the Written Opinion of the International Searching Authority, or the Declaration, in corresponding PCT Application No. PCT/US2016/058376 dated Dec. 20, 2016 (12 pages).

*Primary Examiner* — A. Dexter Tugbang
*Assistant Examiner* — Kaying Kue
(74) *Attorney, Agent, or Firm* — Myers Bigel, P.A.

(57) ABSTRACT

A cover assembly for covering an elongate substrate includes a resilient, elastically expandable sleeve member and a holdout device. The sleeve member defines an axially extending inner sleeve passage. The holdout device includes a generally tubular, flexible bladder sleeve mounted in the inner sleeve passage. The bladder sleeve defines a cavity and a holdout passage to receive the elongate substrate. The cavity is inflated or inflatable with an inflation gas.

20 Claims, 7 Drawing Sheets

(56) References Cited

U.S. PATENT DOCUMENTS

| | | | |
|---|---|---|---|
| 3,357,457 A | 12/1967 | Myer | |
| 3,676,387 A * | 7/1972 | Lindlof | C08K 5/01 |
| | | | 524/489 |
| 3,846,901 A | 11/1974 | Lovett | |
| 3,946,480 A | 3/1976 | Dienes | |
| 3,978,531 A * | 9/1976 | Ilon | A01K 15/00 |
| | | | 5/81.1 T |
| 4,054,743 A | 10/1977 | Mayer et al. | |
| 4,228,792 A * | 10/1980 | Rhys-Davies | A61B 17/1322 |
| | | | 601/19 |
| 4,233,731 A | 11/1980 | Clabburn et al. | |
| 4,268,329 A | 5/1981 | Jervis | |
| 4,391,661 A | 7/1983 | Izraeli | |
| 4,462,651 A | 7/1984 | McGaffigan | |
| 5,030,487 A | 7/1991 | Rosenzweig | |
| 5,070,597 A * | 12/1991 | Holt | F16L 5/02 |
| | | | 138/103 |
| 5,098,752 A | 3/1992 | Chang et al. | |
| 5,205,893 A | 4/1993 | New et al. | |
| 5,280,136 A | 1/1994 | Yaworski et al. | |
| 5,380,224 A | 1/1995 | DiCicco | |
| 5,406,871 A | 4/1995 | Lambert, Jr. | |
| 5,495,650 A | 3/1996 | Crepel et al. | |
| 5,568,949 A * | 10/1996 | Andre | B29C 66/73161 |
| | | | 285/285.1 |
| 5,670,223 A | 9/1997 | Sadlo et al. | |
| 5,753,861 A | 5/1998 | Hansen et al. | |
| 5,925,427 A | 7/1999 | Sadlo et al. | |
| 5,944,929 A | 8/1999 | Vallauri et al. | |
| 5,952,396 A * | 9/1999 | Chang | C08L 23/16 |
| | | | 522/1 |
| 6,049,960 A | 4/2000 | Pilling et al. | |
| 6,245,999 B1 | 6/2001 | Costigan et al. | |
| 6,444,913 B1 | 9/2002 | Kao | |
| 6,762,364 B2 | 7/2004 | Hofmann et al. | |
| 7,265,293 B2 | 9/2007 | Kamel et al. | |
| 8,883,061 B2 * | 11/2014 | Kehl | H02G 15/06 |
| | | | 264/102 |
| 9,178,289 B2 * | 11/2015 | Seraj | H01R 4/70 |
| 9,190,815 B2 | 11/2015 | Seraj | |
| 9,224,520 B2 * | 12/2015 | Spalding | H01B 3/30 |
| 9,498,363 B2 * | 11/2016 | Watson | A61F 2/07 |
| 2005/0171593 A1 * | 8/2005 | Whirley | A61F 2/06 |
| | | | 623/1.13 |
| 2006/0135901 A1 * | 6/2006 | Ingimundarson | A61F 5/0123 |
| | | | 602/26 |
| 2007/0032320 A1 * | 2/2007 | Laliberty | A63B 41/08 |
| | | | 473/604 |
| 2011/0100671 A1 * | 5/2011 | Seraj | H02G 1/14 |
| | | | 174/68.1 |
| 2013/0268048 A1 * | 10/2013 | Watson | A61F 2/07 |
| | | | 623/1.11 |
| 2014/0338953 A1 * | 11/2014 | Seraj | H01R 4/70 |
| | | | 174/138 F |

FOREIGN PATENT DOCUMENTS

| | | | |
|---|---|---|---|
| EP | 0154193 | A1 | 9/1985 |
| EP | 0368235 | A2 | 5/1990 |
| EP | 0399263 | A2 | 11/1990 |
| EP | 0767523 | A3 | 7/1997 |
| EP | 0767523 | A2 | 9/1997 |
| EP | 0815624 | B1 | 5/1999 |
| FR | 2685564 | A1 | 6/1993 |
| WO | WO 89/00782 | A1 | 1/1989 |
| WO | WO 91/16564 | A1 | 10/1991 |
| WO | WO 96/29767 | A1 | 9/1996 |
| WO | WO 98/40941 | A1 | 9/1998 |
| WO | WO 02/07280 | A1 | 1/2002 |
| WO | WO 02/07281 | A1 | 1/2002 |
| WO | WO 02/092328 | A1 | 11/2002 |
| WO | WO 2013/096145 | A2 | 6/2013 |

\* cited by examiner

HOLDOUT DEVICES AND COVER ASSEMBLIES AND METHODS INCORPORATING THE SAME

RELATED APPLICATION(S)

The present application claims the benefit of and priority from U.S. Provisional Patent Application No. 62/253,222, filed Nov. 10, 2015, the disclosure of which is incorporated herein by reference in its entirety.

FIELD OF THE INVENTION

The present invention relates to devices for applying a resilient sleeve onto an elongate substrate such as a cable and, more particularly, to holdout devices for applying a resilient sleeve onto an elongate substrate and cover assemblies and the methods incorporating holdout devices.

BACKGROUND OF THE INVENTION

Protective sleeves or covers are commonly installed on elongate substrates such as power distribution cables as well as other electrical cables. Such sleeves are commonly formed of an electrically insulative, polymeric material. Some known covers of this type are formed of a resilient, elastomeric material. In use, the sleeves are elastically stretched, placed about the substrate, and released, whereupon they recover to a reduced diameter to conform to or seal about the substrate. These sleeves may be referred to as cold-applied covers. It is generally necessary to expand the sleeve to a diameter sufficient to allow the sleeve to be slid onto the substrate. It is known to provide a holdout device or sleeve support in the sleeve to temporarily hold the sleeve in the expanded state. The holdout and the sleeve are slid over the substrate and the holdout is then removed to allow the sleeve to contract about the substrate. Known holdouts may suffer from various drawbacks.

SUMMARY OF THE INVENTION

According to embodiments of the invention, a cover assembly for covering an elongate substrate includes a resilient, elastically expandable sleeve member and a holdout device. The sleeve member defines an axially extending inner sleeve passage. The holdout device includes a generally tubular, flexible bladder sleeve mounted in the inner sleeve passage. The bladder sleeve defines a cavity and a holdout passage to receive the elongate substrate. The cavity is inflated or inflatable with an inflation gas.

According to method embodiments of the invention, a method for covering an elongate substrate includes providing a cover assembly including: a resilient, elastically expandable sleeve member defining an axially extending inner sleeve passage; and a holdout device including a generally tubular, flexible bladder sleeve mounted in the inner sleeve passage, the bladder sleeve defining a cavity and a holdout passage to receive the elongate substrate. The cavity is inflated or inflatable with an inflation gas. The method further includes inserting the elongate substrate into the holdout passage.

Further features, advantages and details of the present invention will be appreciated by those of ordinary skill in the art from a reading of the figures and the detailed description of the embodiments that follow, such description being merely illustrative of the present invention.

BRIEF DESCRIPTION OF THE DRAWINGS

FIG. 10 is a cross-sectional view taken along the line 10-10 of FIG. 9.

DETAILED DESCRIPTION OF EMBODIMENTS OF THE INVENTION

Figure 1:
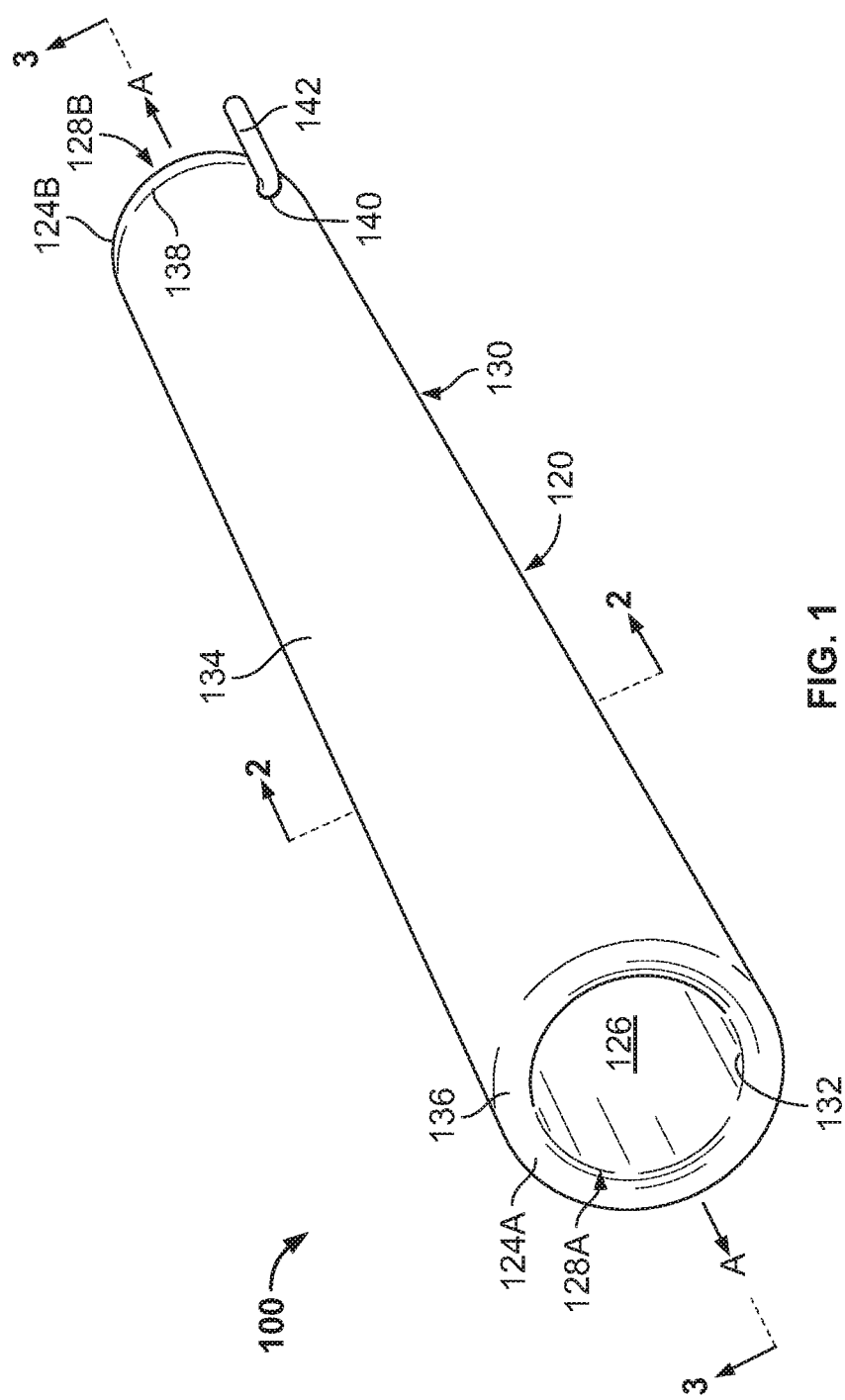
FIG. 1 is a perspective view of a holdout device according to embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

As used herein, "monolithic" means an object that is a single, unitary piece formed or composed of a material without joints or seams.

With reference to FIGS. 1-13, a holdout device 100 according to embodiments of the present invention is shown therein. In some embodiments, a sleeve member 20 is mounted on the holdout device 100 to form a cover assembly 10. The holdout device 100 and the cover assembly 10 may be used to install the sleeve member 20 over an elongated substrate such as a cable 40 and/or a cable splice or other cable assembly or accessory (e.g., a cable midsection or a cable termination) to protect the cable 40 or other substrate. As discussed in more detail below, the substrate may be slid into the the cover assembly 10 and the holdout device 100 then removed to allow the sleeve member 20 to contract about the substrate.

Turning to the sleeve member 20 in more detail, the sleeve member 20 may be referred to as a cold recoverable sleeve, a cold applied sleeve or cold shrinkable sleeve. The illustrated sleeve member 20 is merely exemplary and is a cover sleeve. In other embodiments, the sleeve member 20 may be a cold shrink joint body (e.g., including a tubular insulation layer and integral, tubular electrical stress control layers).

Generally, the sleeve member 20 is a tubular structure that is formed of elastomeric-like material or has elastomeric physical recovery properties so that, when the sleeve member 20 is radially stretched to an expanded position by a restraint and thereafter released from the restraint, the sleeve member 20 will recover or return to a smaller radius (i.e., a recovered position). In practice, a further restraint (e.g., a substrate) may prevent the sleeve member 20 from fully recovering to a relaxed state, so that the sleeve member 20 continues to exert a radially compressive force on the substrate in the recovered position.

Figure 5:
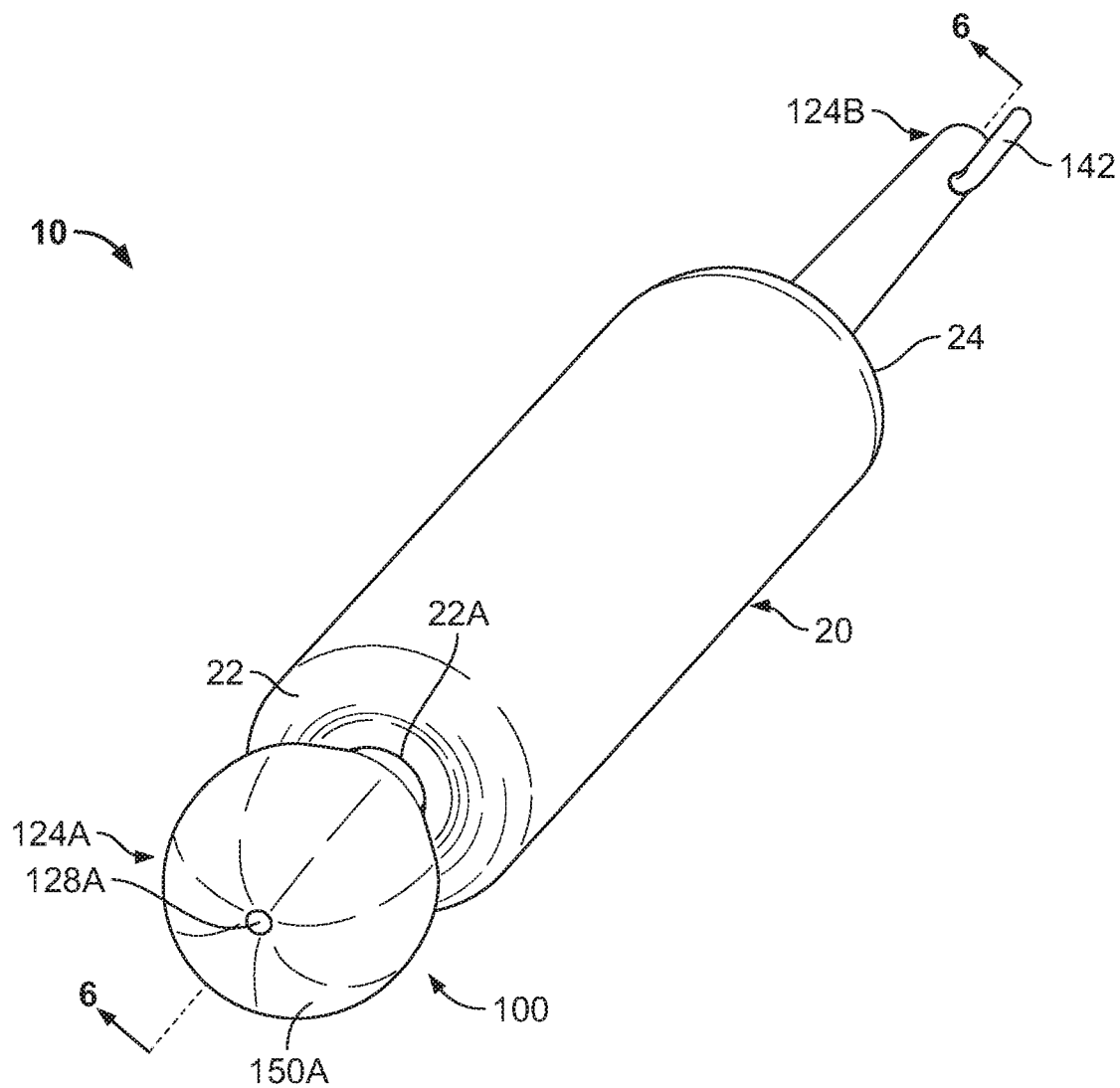
FIG. 5 is a perspective view of a cover assembly including the holdout device of FIG. 1 and a sleeve member.
Figure 6:
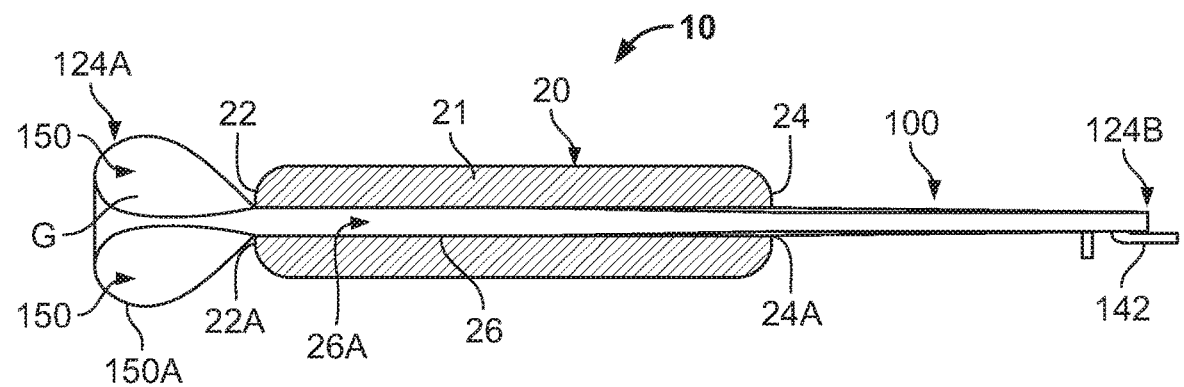
FIG. 6 is a cross-sectional view of the cover assembly of FIG. 5 taken along the line 6-6 of FIG. 5.

With reference to FIGS. 5 and 6, the sleeve member 20 includes a body 21 having opposed ends 22 and 24. An inner surface 26 of the sleeve member 20 defines an inner passage 26A (FIG. 3) communicating with opposed end openings 22A and 24A. In some embodiments (not shown), the sleeve member 20 may further include a plurality of integral sheds extending radially outwardly from the body 21.

At least a portion of the body 21, and according to some embodiments substantially the entire body 21 is formed of a resilient, radially elastic material. That is, the body 21 can be stretched radially and to an expanded (i.e., radially enlarged) condition and, upon release, will radially contract or recover to a partially or fully recovered condition having a smaller radius.

The body 21 may be formed of any suitable material. According to some embodiments, the body 21 is formed of an elastomeric material. Suitable elastomeric materials include natural and synthetic polyisoprenes, polybutadiene, styrene-butadiene rubber (SBR), butadiene-acrylonitrile rubber, polychlorophrene (Neoprene), butyl rubber, polysulfide, silicone rubber, urethane rubber, polyacrylate, epichlorohydrin homo and copolymers, propylene oxide rubber, fluorosilicone rubber, fluorocarbon rubber, chlorosulfonated polyethylene, chlorinated polyethylene, ethylene-propylene rubber.

Figure 2:
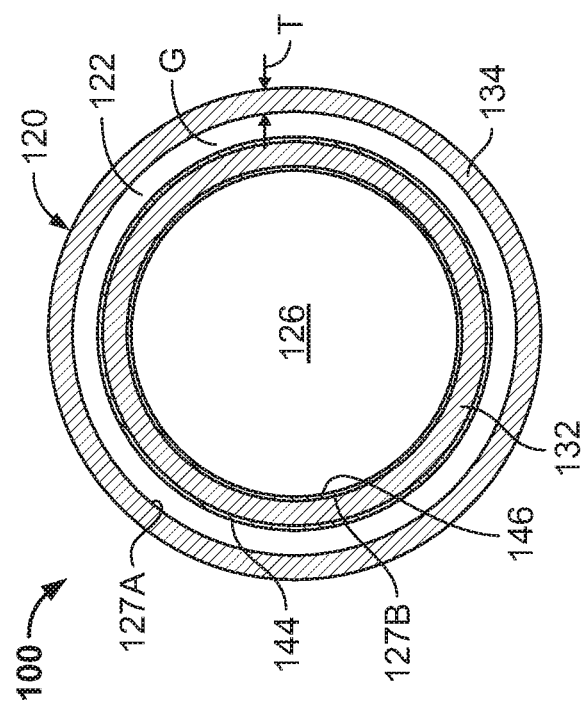
FIG. 2 is a cross-sectional view of the holdout device of FIG. 1 taken along the line 2-2 of FIG. 1.

With reference to FIGS. 1-4, the holdout device 100 includes a containment or bladder sleeve 120 defining a chamber or bladder cavity 122. The cavity 122 may be filled with an inflation gas G, as discussed in more detail below. The holdout device 100 further includes an inlet or inflation port 140. In some embodiments, the holdout device 100 further includes a mass or layer of lubricant 144 (e.g., a lubricating grease; FIG. 2) on an inner surface 127A thereof (i.e., the surface defining the cavity 122).

The bladder sleeve 120 has a longitudinal central holdout device axis A-A. The bladder sleeve 120 extends from an end 124A to an opposing end 124B along the axis A-A. The ends 124A, 124B define the opposed axial ends of the holdout device 100. Openings 128A and 128B are defined at the ends 124A and 124B and communicate with an axially extending central through passage 126 of the bladder sleeve 120.

The bladder sleeve 120 is a tubular, cylindrical, integral, double-walled sleeve of unitary or single-piece construction. The bladder sleeve 120 includes a bladder layer 130 including a cylindrical, tubular inner wall 132 and a cylindrical tubular outer wall 134 joined at the ends 124A, 124B. The outer surface 127B (i.e., the surface facing away from the cavity 122) of the inner wall 132 defines the through passage 126. The walls 132, 134 of the bladder sleeve 120 form an endless, continuous band. The cavity 122 is defined as an annular or tubular cavity between the inner wall 132 and the outer wall 134.

The bladder sleeve 120 is axially revolvable about itself so that the portions thereof that constitute the inner wall 132 and the outer wall 134 at any given time may vary depending on the position of the bladder sleeve 120. Likewise, the portions of the bladder sleeve 120 positioned at the end 124A will change as the bladder sleeve 120 is revolved or rolled. That is, when the bladder sleeve 120 is revolved along its axis, the bladder sleeve 120 will evaginate (i.e., turn inside-out by eversion of the inner wall) or invaginate (i.e., turn outside-in by inversion of the outer wall) at an end 124A of the bladder sleeve 120.

The bladder sleeve 120 can be formed of any suitable material. According to some embodiments, the bladder sleeve 120 is formed of a flexible, pliable material.

According to some embodiments, the bladder sleeve 120 is formed of a substantially inelastic material. According to some embodiments, the bladder sleeve 120 is formed of a substantially inelastic material selected from the group consisting of PTFE or polyester. According to some embodiments, the bladder sleeve 120 has an elastic modulus of no greater than about 5 psi, in some embodiments no greater than 8 psi, and, in some embodiments, in the range of from about 5 to 8 psi.

According to other embodiments, the bladder sleeve 120 is formed of a somewhat elastic material. According to some embodiments, the bladder sleeve 120 is formed of an elastic material selected from the group consisting of latex. According to some embodiments, the bladder sleeve 120 has an elastic modulus in the range of from about 20 to 30 psi.

According to further embodiments, the bladder sleeve 120 is formed of an elastic material. According to some embodiments, the bladder sleeve 120 is formed of an elastic material selected from the group consisting of rubber. According to some embodiments, the bladder sleeve 120 has an elastic modulus in the range of from about 10 to 20 psi.

According to some embodiments, the bladder layer 130 is formed of a thin-wall or thin sheet material. According to some embodiments, the thickness T (FIG. 2) of the bladder layer 130 is in the range from about 0.03 to 0.06 inch.

Figure 4:
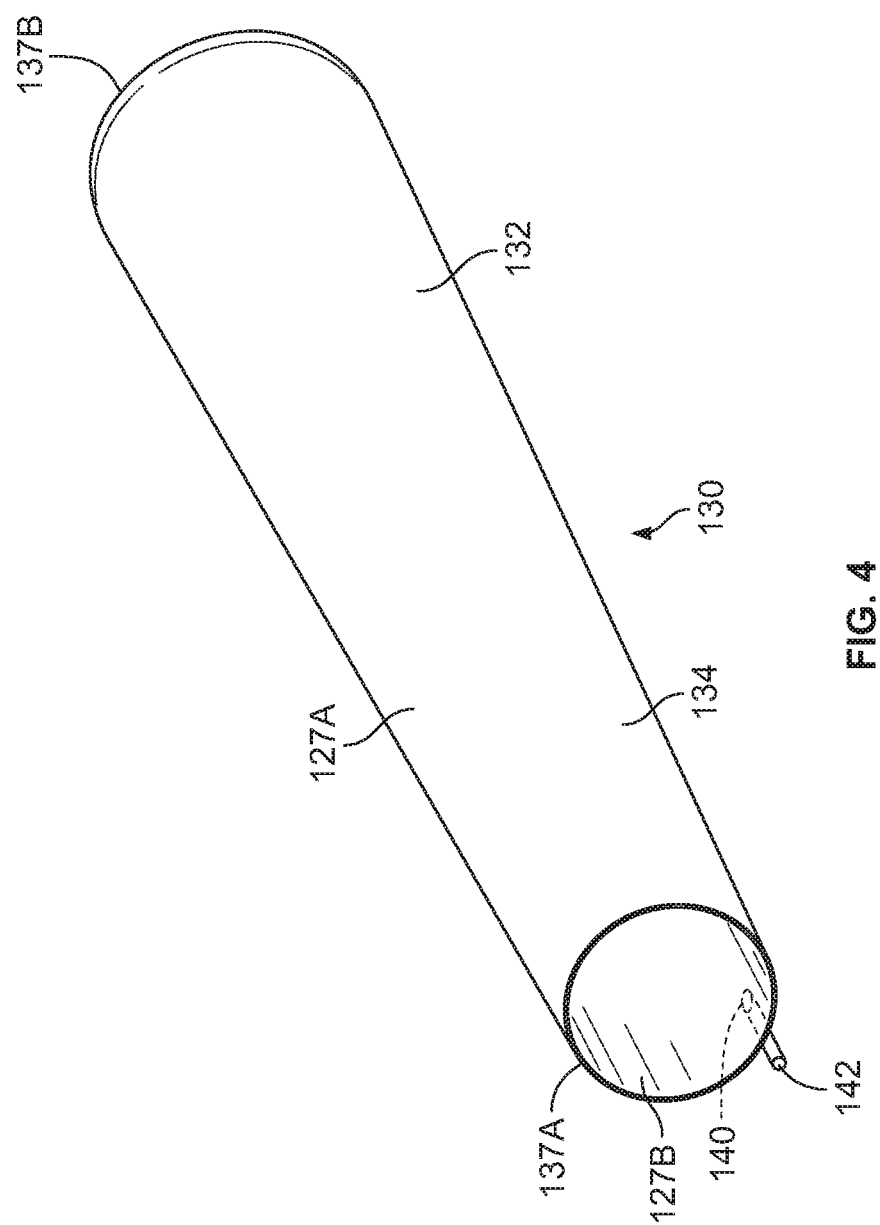
FIG. 4 is a perspective view of a bladder layer and a valve forming parts of the holdout device of FIG. 1 prior to folding the bladder layer to form the holdout device.

In some embodiments and as shown, the bladder layer 130 has opposed terminal edges 137A, 138A and the walls 132, 134 are joined at the end 124A by a fold 136 and are joined at the other end 124B by an annular seam 138. In this case, the bladder layer 130 can be formed as a tube (e.g., as shown in FIG. 4), then folded or inverted into itself to form the fold 136, and then sealed at the terminal edges 137A, 138A to form the seam 138. In some embodiments, the bladder sleeve 120 is continuous and free of seams other than the seam 138.

The inflation port 140 is adapted to provide fluid communication between the cavity 122 and the exterior of the bladder sleeve 120. In some embodiments and as shown, the inflation port 140 is provided with a one-way valve 142 (e.g., a check valve) that permits the influx of an inflation fluid into the cavity through the port 140 while preventing the release of the inflation fluid out of the cavity 122 through the port 140.

In some embodiments, the inner lubricant 144 is disposed in the cavity 122 and covers all or a portion of the inner surface 127A of the bladder layer 130. Suitable lubricants may include silicone or fluorosilicone grease.

In some embodiments, an outer lubricant 146 covers all or a portion of the outer surface 127B. The lubricant 146 may extend fully or partially down the length of the outer surface 127B of the inner wall 132. In some embodiments, the lubricant 146 also covers the outer surface of a portion or all of the outer wall 134. Suitable lubricants may include silicone or fluorosilicone grease. The lubricant 146 can be installed on the bladder layer 130 before or after inserting the holdout device 100 in the sleeve member 20.

The holdout device 100 may be formed by any suitable method. In some embodiments, the bladder sleeve 120 is formed from a sheet of the bladder layer 130 as described above. In this case, the bladder layer 130 is formed or provided as a pliable tube, which is then inverted or folded into itself. The opposing walls 132, 134 are then sealed (e.g., by heat sealing, welding or adhesive) adjacent or at the free terminal edges to form the sealed cavity 122. The inflation port 140 is formed in the bladder layer 130 and the valve 142 is installed therein.

The illustrated substrate is an electrical power transmission cable 40 (FIGS. 8-10; e.g., a medium voltage cable) and has a lead end 46. The cable 40 is merely exemplary of substrates that may be used with the holdout device 100. The cable 40 includes an electrical conductor 42 surrounded by an electrically insulating jacket 44. The conductor 42 may be terminated at by a connector or termination (not shown), and may be mechanically and electrically coupled to the conductor of another thereby. It may be desirable or necessary to apply an environmental protection cover such as the sleeve member 20 over the cable, connector and/or other termination.

The holdout device 100 may be used as follows to install the sleeve member 20 on the cable 40 or other substrate.

Figure 3:
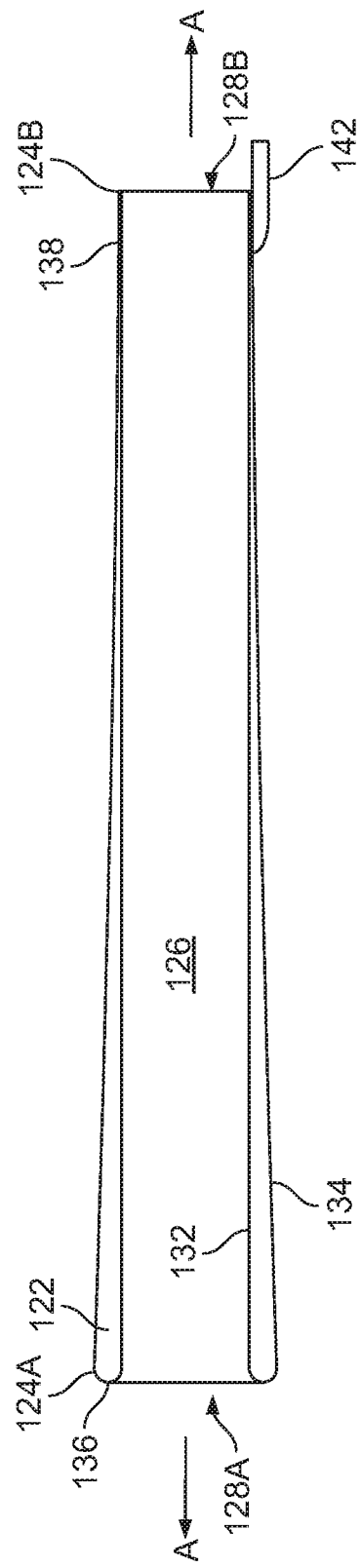
FIG. 3 is a cross-sectional view of the holdout device of FIG. 1 taken along the line 3-3 of FIG. 1.

The holdout device 100 is provided in a first inflation position, condition or state as shown in FIGS. 1-3. In the first inflation state, only a first amount of inflation gas G is trapped in the cavity 122. The first amount of inflation gas may be zero (i.e., the cavity may be void of inflation gas).

With the holdout device 100 in the first inflation state, the holdout device 100 is inserted into the passage 126 of the sleeve member 20 as shown in FIGS. 5 and 6 to form the cover assembly 10. The inner diameter of the relaxed sleeve member 20 may be less than the outer diameter of the holdout device 100 so that the sleeve member 20 radially compresses the bladder sleeve 120, displacing the inflation gas and causing a volumetrically enlarged, annular pocket or region 150 of the inflation gas to form in the cavity at the end 124A outside the sleeve member 20. The annular pocket 150 forms a bulging section 150A of the bladder sleeve 120.

Figure 7:
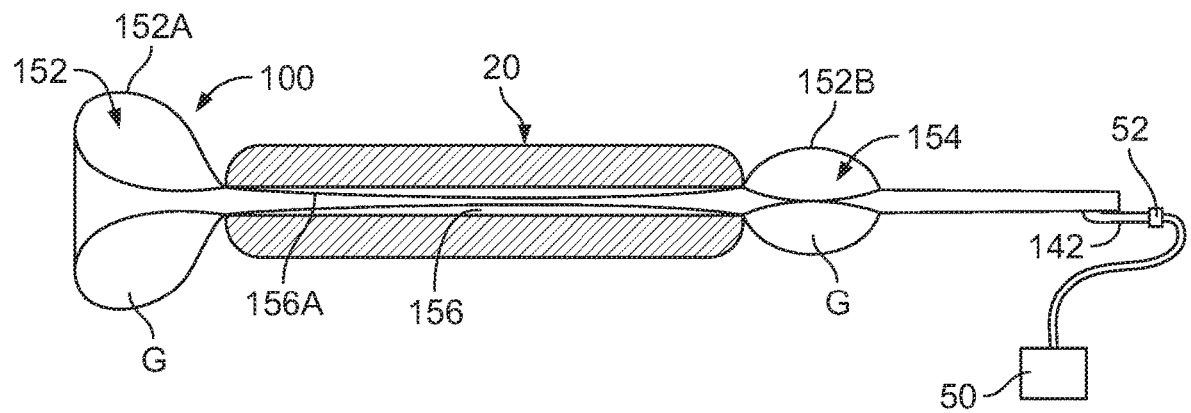
FIGS. 7-13 are cross-sectional views of the cover assembly of FIG. 5 and a cable illustrating installation of the sleeve member from the cover assembly onto the cable.

A pressurized inflation gas is then introduced into the cavity 122 through the valve 142 and port 140 to inflate the holdout device 100 to a second inflation position, condition or state as shown in FIG. 7. In the second inflation state, a greater amount of inflation gas G is trapped in the cavity 122 than in the first inflation state. The pressurized inflation gas may be introduced into the cavity 122 using a pump 50 having a nozzle 52 (FIG. 7), for example.

With the holdout device 100 in the second inflation state installed in the sleeve member 20 as described (and without the cable 40 installed therein), volumetrically enlarged, annular pockets or regions 152 and 154 of the inflation gas are formed in the cavity 122 at the ends 124A and 124B, respectively, outside the sleeve member 20. The annular pockets 152 and 154 form bulging sections 152A and 154A of the bladder sleeve 120. Also, an annular or tubular pocket or region 156 of the inflation gas is formed in the sleeve member 20 between and in fluid communication with the end regions 152, 154. The pocket 156 forms a bulging section 156A of the bladder sleeve 120. In this position, the holdout device 100 may or may not hold the sleeve member 20 in a radially expanded position.

Figure 8:
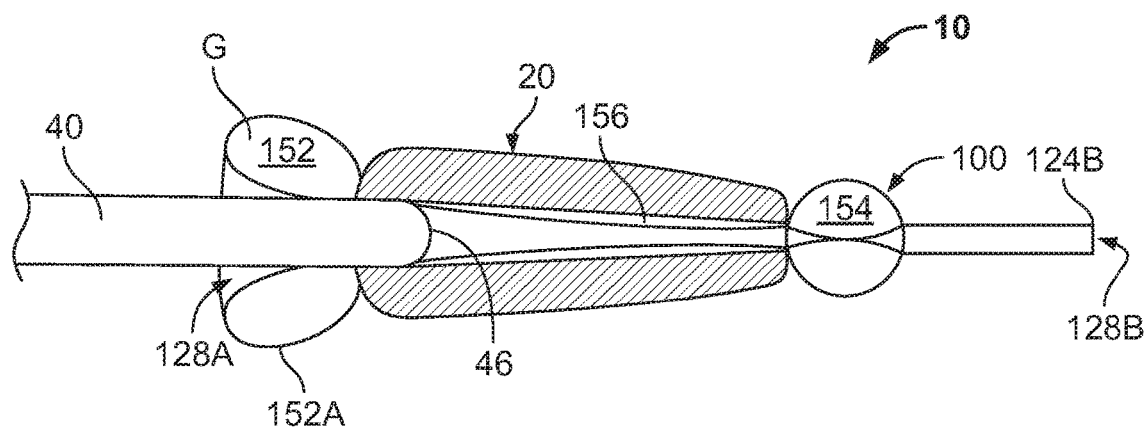

The lead end 46 of the cable 40 is then inserted into the holdout passage 126 through the opening 128A, as shown in FIG. 8. More particularly, the lead end 46 is inserted into and through the annular pocket 152 and into the sleeve member passage 26A through the end opening 22A. The cable 40 slides axially across and relative to the bladder sleeve 120. The installer may hold the exposed end of the holdout device 100. The lubricant 146 may facilitate the sliding movement.

The annular pocket 152 and the bulging section 152A help to guide the cable end 46 through the sleeve member opening 22A. Moreover, the inflation gas in the cavity 122 provides mechanical advantage so that the cable 40 can be inserted with lower required minimum insertion force. In some embodiments, the inflation gas in the bladder sleeve 120 spatially distributes the insertion force along the length of the bladder sleeve 120 so that the radial expansion of the sleeve member 20 required to receive the cable 40 is axially distributed along the length of the sleeve member 20, and the maximum radial expansion of the sleeve member 20 is thereby reduced. Because the compression load exerted by the sleeve member 20 increases nonlinearly as a function of radial expansion, less force is required to insert the cable 40. The holdout 100 thereby serves as a "ball bearing" to ease insertion of the cable 40 into the sleeve member 20.

Figure 9:
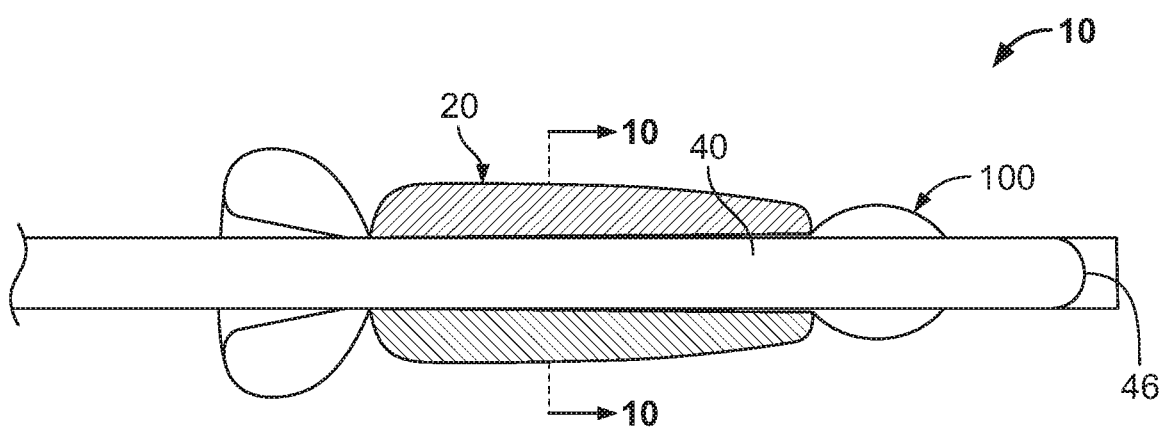
Figure 10:
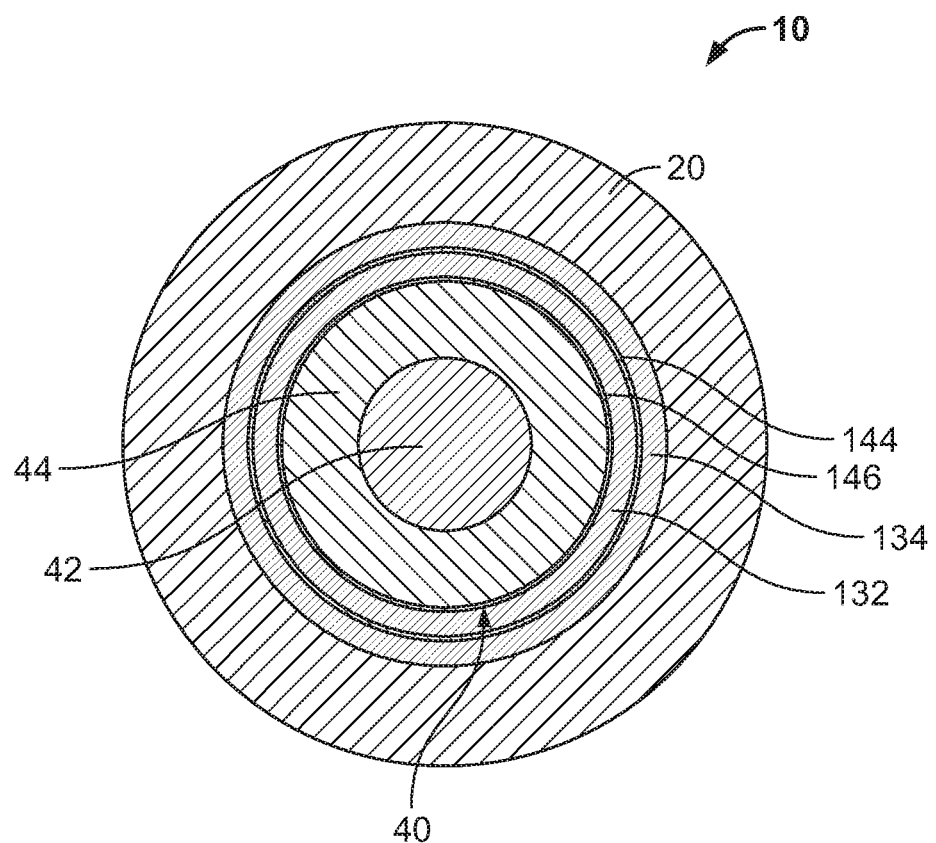

With reference to FIGS. 9 and 10, the installer continues to insert the cable 40 through the holdout passage 126 until the sleeve member 20 is axially positioned on the cable 40 where desired. In the illustrated embodiment, the cable 40 extends fully through the sleeve member 20. Insertion of the cable 40 is facilitated or eased by the inflation gas in the bladder sleeve 120 as described above. The fully inserted cable 40 will further displace the inflation gas in the cavity 122 so that the annular regions 152, 154 are further enlarged.

With the cable 40 inserted, the sleeve member 20 is held thereby in a radially expanded condition or state as compared to its relaxed state and its intended installed state. It will be appreciated that the elastically expanded sleeve member 20 applies a persistent radially compressive load on the holdout device 100 and the cable 40.

Figure 11:
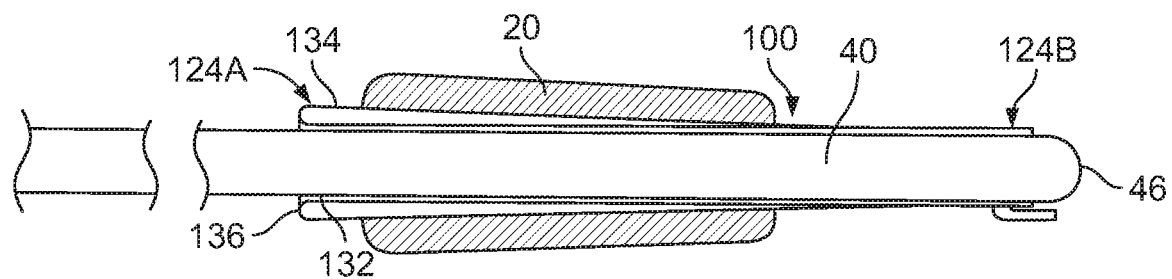

With the cable 40 inserted as described above, the bladder sleeve 120 is deflated, as shown in FIG. 11. That is, a portion or all of the inflation gas is released from the cavity 122 so that bladder sleeve 120 assumes a third inflation position, condition or state wherein the amount of inflation gas in the cavity 122 is less than in the second inflation state. The bladder sleeve 120 is thereby permitted to radially collapse. The bladder sleeve 120 may be deflated using any suitable technique. For example, the pressurized inflation gas may be released through the port 140 and valve 142, through another port, or by cutting an opening into the bladder layer 130 adjacent the end 124B.

Figure 12:
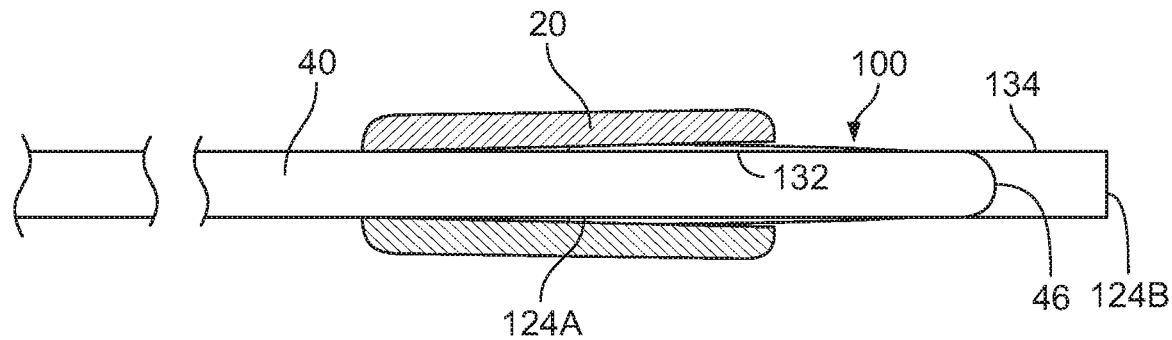
Figure 13:
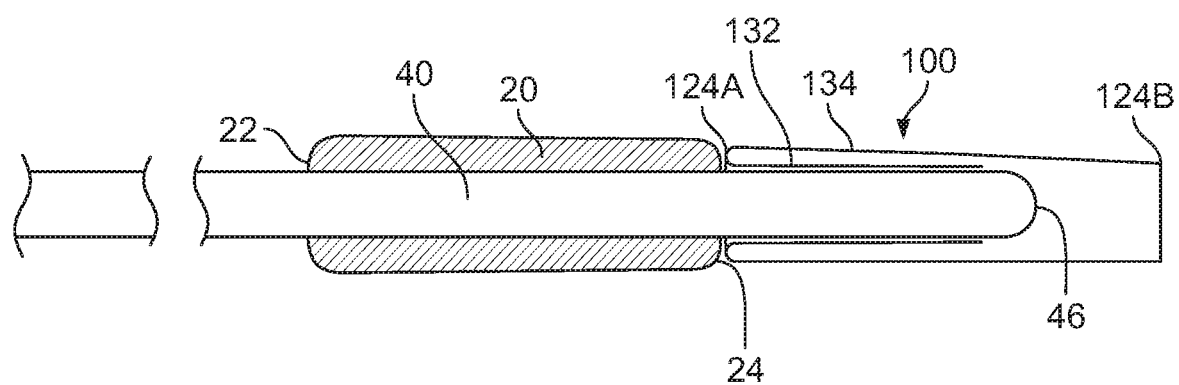

With the reference to FIG. 12, with the holdout device 100 in the third inflation state (e.g., deflated), the holdout device 100 is withdrawn from the sleeve member 20. More particularly, the outer wall 134 is pulled axially toward the end 124B so that the outer wall 134 evaginates or rolls at the fold and slides over the inner wall 132. The inner wall 132 may peel away from the cable 40. In this manner, the end 124A of the holdout device 100 is retracted relative to the sleeve member 20 and drawn fully through and out of the sleeve member 20 through the opening as shown in FIG. 13. The holdout device 100 is then free of the sleeve member 20, allowing the sleeve member 20 to engage the cable 40 from the end 22 to the end 24 as shown in FIG. 13.

The installed sleeve member 20 may form a seal with the substrate 40. In some embodiments, the sleeve member 20 is configured so that, when installed on the substrate 40, the recovered sleeve member 20 remains in a partially expanded position (as compared to its relaxed state) so that the sleeve member 20 continues to apply a persistent radially compressive load to the substrate 40.

With the holdout device 100 now free of the sleeve member 20, the installer can remove the holdout device 100 from the cable 40. For example, the holdout device 100 may be pulled, torn or cut from the cable 40. The removed holdout device 100 can then be discarded or otherwise disposed of.

The inflation gas G may be any suitable gas. In some embodiments, the inflation gas G is air and, in some embodiments, ambient air.

The outer surface 127B of the bladder sleeve 120 and/or the inner surface of the sleeve member 20 may be lubricated during installation of the sleeve member 20 on the substrate or during assembly at the factory (i.e., the holdout 100, the sleeve member 20 and/or the pre-assembled cover assembly 10 may be provided to the installer pre-lubricated).

The holdout device 100 can be provided separate from sleeve and inserted, inflated by end user as described above. According to further embodiments, the holdout device 100 is installed in the sleeve member 20 in the factory and the pre-assembled cover assembly 10 is provided to the installer with the holdout device in the first inflation state. The installer then inflates the holdout device 100 as described above during installation. The cover assembly 10 may be stored, transported, etc. with the holdout device 100 mounted in the sleeve member 20.

According to further embodiments, the holdout device 100 is installed in the sleeve member 20 in the factory and the pre-assembled cover assembly 10 is provided to the installer with the holdout device in the second inflation state. The installer then inserts the substrate into the holdout device 100 as described above during installation, but need not further inflate the holdout device. The cover assembly 10 may be stored, transported, etc. with the inflated holdout device 100 mounted in the sleeve member 20.

According to some embodiments, when the sleeve member 20 as mounted on the holdout device 100 in the undeployed cover assembly 10 (e.g., FIG. 7), the sleeve member 20 is expanded to no more than about 108% of its relaxed diameter. According to some embodiments, the sleeve member 20 in this condition is not expanded beyond its relaxed diameter.

According to some embodiments, when the sleeve member 20 as mounted on the holdout device 100 in the inflated cover assembly 10 with the substrate 40 inserted therein (i.e., FIG. 9), the sleeve member 20 is expanded at least about 105% of its relaxed diameter and, in some embodiments, from about 110 to 115% of its relaxed diameter.

Advantageously, after the sleeve member has been installed, the holdout device can be easily removed from the substrate even when an opening or terminal end of the substrate is not available or conveniently accessible to slide the holdout device off of the substrate.

Advantageously, holdout devices according to embodiments of the invention (e.g., the holdout device 100) can eliminate the need to pre-expand the sleeve member (e.g., the sleeve member 20, which may be a joint body) or reduce the extent to which the sleeve member is expanded prior to installation of the substrate (e.g., during storage and shipping). Typically, cold-applied cable accessories (e.g., joint bodies) must be expanded in the factory before reaching the installer. This process can induce a tension set on the elastic joint body, limiting its shelf life. Holdout devices as disclosed herein can thus reduce or prevent reduction in shelf life due to such tension set.

Holdout devices and cover assemblies according to embodiments of the invention can provide an effective mechanism for applying a cold-applied or cold-shrinkable cover onto an elongate substrate such as a cable, cable splice or cable termination.

The holdout devices and cover assemblies may enable the elastic sleeve member to be installed more easily than with a push-on type sleeve member or holdout, and more conveniently that in the case of a sleeve member pre-expanded on a rigid holdout.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. A method for covering an elongate substrate, the method comprising:
providing a cover assembly including:

a resilient, elastically expandable sleeve member defining an axially extending inner sleeve passage; and a holdout device including a generally tubular, flexible bladder sleeve mounted in the inner sleeve passage, the bladder sleeve defining a cavity and a holdout passage to receive the elongate substrate;

wherein the cavity is inflated or inflatable with an inflation gas; and inflating the bladder sleeve; and thereafter inserting the elongate substrate into the holdout passage while the bladder sleeve is inflated.

2. The method of claim 1 including deflating the bladder sleeve following the step of inserting the elongate substrate into the holdout passage.

3. The method of claim 2 including removing the holdout device from the sleeve member following the step of deflating the bladder sleeve and such that the elongate substrate remains in the inner sleeve passage of the sleeve member.

4. The method of claim 1 wherein the bladder sleeve is a tubular, double-walled sleeve, and the cavity is enclosed and defined by walls of the double-walled sleeve.

5. The method of claim 4 wherein the bladder sleeve is formed of a pliable thin-wall material.

6. The method of claim 5 wherein the bladder sleeve is formed of polyester or PTFE.

7. The method of claim 5 wherein the bladder sleeve is formed of an elastic material having an elastic modulus in the range of from about 20 to 30 psi.

8. The method of claim 4 wherein the holdout device includes a lubricant in the enclosed cavity of the double-walled sleeve.

9. The method of claim 4 wherein the bladder sleeve is axially revolvable about itself.

10. The method of claim 1 wherein:

the holdout device includes an inflation port; and the method includes inflating the cavity through the inflation port.

11. The method of claim 10 wherein the holdout device includes a valve to control flow of the inflation gas through the inflation port.

12. The method of claim 1 wherein the holdout device includes a lubricant in the holdout passage.

13. The method of claim 1 wherein the sleeve member is formed of an elastomeric material.

14. The method of claim 1 wherein the step of inserting the elongate substrate into the holdout passage includes inserting the elongate substrate into the holdout passage while the holdout device is disposed in the inner sleeve passage.

15. The method of claim 1 wherein the step of providing a cover assembly includes inserting the holdout device into the sleeve member before inserting the elongate substrate into the holdout passage.

16. The method of claim 1 wherein the holdout device includes an inflated bulging section adjacent an entrance end opening of the sleeve member, and the bulging section helps to guide the elongate substrate into the inner sleeve passage through the entrance end opening.

17. A method for covering an elongate substrate, the method comprising:

providing a cover assembly including:

a resilient, elastically expandable sleeve member defining an axially extending inner sleeve passage; and a holdout device including a generally tubular, flexible bladder sleeve mounted in the inner sleeve passage, the bladder sleeve defining a cavity and a holdout passage to receive the elongate substrate;

wherein the cavity is inflated or inflatable with an inflation gas; and inserting the elongate substrate into the holdout passage;

wherein the bladder sleeve is a tubular, double-walled sleeve, and the cavity is enclosed and defined by walls of the double-walled sleeve; and wherein the bladder sleeve is axially revolvable about itself.

18. A method for covering an elongate substrate, the method comprising:

providing a cover assembly including:

a resilient, elastically expandable sleeve member defining an axially extending inner sleeve passage; and a holdout device including a generally tubular, flexible bladder sleeve mounted in the inner sleeve passage, the bladder sleeve defining a cavity and a holdout passage to receive the elongate substrate;

wherein the cavity is inflated or inflatable with an inflation gas; and inserting the elongate substrate into the holdout passage;

wherein the step of inserting the elongate substrate into the holdout passage includes inserting the elongate substrate into the holdout passage while the holdout device is disposed in the inner sleeve passage.

19. A method for covering an elongate substrate, the method comprising:

providing a cover assembly including:

a resilient, elastically expandable sleeve member defining an axially extending inner sleeve passage; and a holdout device including a generally tubular, flexible bladder sleeve mounted in the inner sleeve passage, the bladder sleeve defining a cavity and a holdout passage to receive the elongate substrate;

wherein the cavity is inflated or inflatable with an inflation gas; and inserting the elongate substrate into the holdout passage;

wherein the step of providing a cover assembly includes inserting the holdout device into the sleeve member before inserting the elongate substrate into the holdout passage.

20. A method for covering an elongate substrate, the method comprising:

providing a cover assembly including:

a resilient, elastically expandable sleeve member defining an axially extending inner sleeve passage; and a holdout device including a generally tubular, flexible bladder sleeve mounted in the inner sleeve passage, the bladder sleeve defining a cavity and a holdout passage to receive the elongate substrate;

wherein the cavity is inflated or inflatable with an inflation gas; and inserting the elongate substrate into the holdout passage;

wherein the holdout device includes an inflated bulging section adjacent an entrance end opening of the sleeve member, and the bulging section helps to guide the elongate substrate into the inner sleeve passage through the entrance end opening.

\* \* \* \* \*